UNITED STATES PATENT OFFICE.

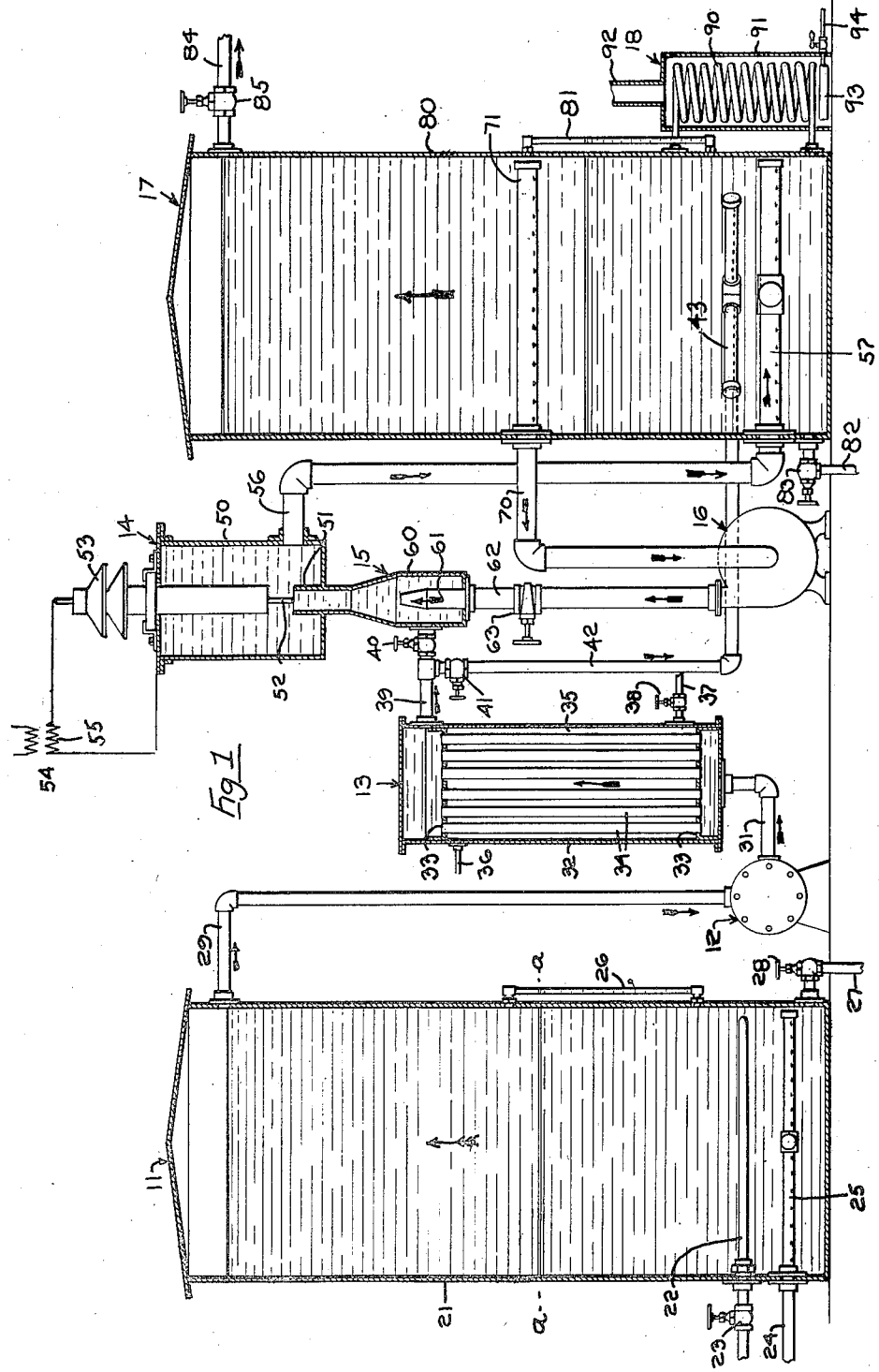

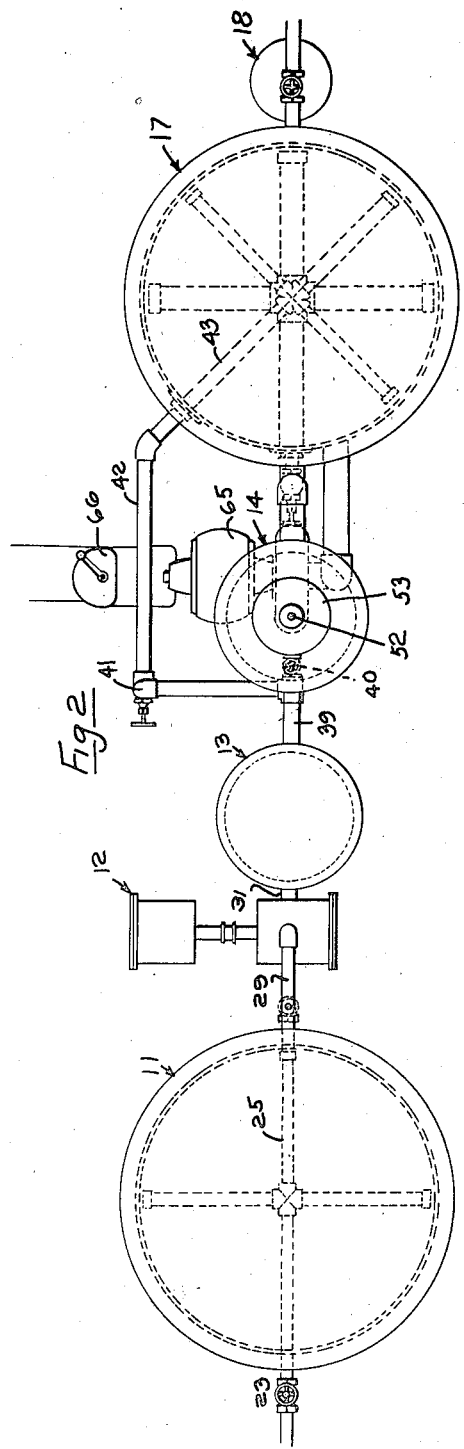

FORD W. HARRIS, OF LOS ANGELES, CALIFORNIA, ASSIGNOR, BY MESNE ASSIGNMENTS, TO PETROLEUM RECTIFYING COMPANY, OF SAN FRANCISCO, CALIFORNIA, A CORPORATION OF CALIFORNIA.

APPARATUS FOR REMOVING WATER FROM PETROLEUM EMULSIONS.

1,405,118.   Specification of Letters Patent.   Patented Jan. 31, 1922.

Application filed April 28, 1919. Serial No. 293,317.

*To all whom it may concern:*

Be it known that I, FORD W. HARRIS, a citizen of the United States, residing at Los Angeles, county of Los Angeles, State of California, have invented a new and useful Improvement comprising an Apparatus for Removing Water from Petroleum Emulsions, of which the following is a specification.

My invention relates to the art of petroleum dehydration and the object of my invention is to provide a novel process by which the water may be removed from such emulsions, and also to provide an apparatus by which it will be easy to handle widely different characters of oils by suitable adjustments of the apparatus.

Referring to the drawings, which are for illustrative purposes only,

Fig. 1 is a diagrammatic side elevation partly in section and showing one form of my invention.

Fig. 2 is a plan view of my apparatus.

In the drawings I show a primary wash tank 11, a feed pump 12, a heater 13, a treater 14, a mixer 15, a circulating pump 16, a secondary wash tank 17, and a secondary washer heater 18.

The primary wash tank 11 consists of a shell 21 having a tight top and bottom, inside of which is a steam coil 22, the flow of steam to the coil 22 being controlled by a valve 23. The crude and wet oil is delivered through a pipe 24 to a perforated cross 25 in the bottom of the tank 11, a body of water being maintained in the bottom of the tank when in operation, the level of this water being readily ascertained by a water gauge 26 and the level of this water being maintained within limits by drawing water off from time to time through a water outlet pipe 27 controlled by a valve 28. An oil outlet pipe 29 delivers oil from the top of the primary wash tank 11 to the suction inlet of the feed pump 12, which may be of any convenient form; a somewhat diagrammatic steam pump being shown. Oil from the pressure outlet of the pump 12 is delivered through a pipe 31 to the bottom of the heater 13 which may also be of any convenient form, that shown consisting of a shell 32 having intermediate heads 33 between which oil tubes 34 are connected, the space between the heads 33 forming a steam space 35 which is supplied with steam through a pipe 36, the water of condensation being withdrawn through a pipe 37, controlled by a valve 38. The oil entering the bottom of the heater passes upwardly through tubes 34 where it is heated by the steam surrounding these tubes, passing outwardly through a pipe 39, which is connected through a valve 40 into the mixer 15 and through a valve 41 and a pipe 42 into a perforated cross 43 located in the secondary wash tank 17.

The treater 14 consists of a shell 50 having a tight bottom into which the upper end 51 of the mixer projects, this upper end of the mixer forming one of the electrodes of the circuit, the other electrode consisting of a rod 52, carried by an insulator 53 through the top of the mixer 15. A transformer 54 has one side of its secondary 55 connected to the rod 52 and its other side connected to the shell of the treater 50 and therefore to the upper end 51 of the mixer. Oil is carried from the treater 50 through a pipe 56 and delivered to a perforated cross 57 in the bottom of the secondary wash tank 17.

The mixer 15 consists of a tight shell 60, the upper end 51 of which projects into the treater 14 as explained above. The mixer has an internal nozzle 61 which is connected through a pipe 62 having a valve 63 with the circulating pump 16. This circulating pump 16 can conveniently be a centrifugal being driven by a motor 65 having a variable speed controller 66. The circulating pump 16 takes oil through a pipe 70 from a perforated pipe 71 located in the secondary wash tank 17 just above high water line.

The secondary wash tank 17 consists of a tight shell 80 having the perforated crosses 43 and 57 near the bottom thereof and having the pipe 71 located somewhere near the center thereof. A body of water is maintained in the bottom of this tank, the height thereof being observed by means of a water glass 81, this water being drawn off from time to time by a water outlet pipe 82 having a valve 83. Cleaned oil is withdrawn through a pipe 84 having a valve 85. The water in the bottom of the tank 17 may conveniently be heated by means of the secondary wash tank heater 18 which consists of a coil 90 inside a shell 91 having a flue 92; the space inside the shell 91 being supplied with hot gases from a burner 93 supplied with gas or oil from pipe 94.

The method of using my invention is as follows:

The oil to be treated being delivered through the pipe 24, this oil passes through the perforations of the cross 25 and rises in a number of thin streams through the body of the water in the primary wash tank 11. The water is kept hot by means of the steam coil 22 and is maintained at about the level $a$—$a$ by drawing off the excess water from time to time through the pipe 27. In the primary wash tank 11 any free water carried in the crude oil, that is to say any water which is not in the form of emulsion, is caught so that the oil passing over through the pipe 29 contains very little or none of this free water, all the water being carried over, being in the form of fine emulsion. The oil in the pipe 29 is forced by the pump 12 through the heater 13 where it is raised in temperature to some point below the boiling point of water and usually around 120° Fahr.

In one method of operation of my apparatus the valve 41 is closed and the oil from the pipe 39 is forced into the interior of the mixer 15 where it is mixed with oil from the secondary wash tank 17 which is delivered by the pump 16. The mixture of oil from the secondary wash tank and the wet oil from the primary wash tank 11 is forced upwardly into the treater 14, passing through the field set up between the electrodes 51 and 52. The oil passing through the electric field is partially dehydrated the finely emulsified water being agglomerated into larger masses which pass as a mechanical mixture with the oil through the pipe 56 and into the cross 57 rising in a series of streams through the perforations in this cross through the body of the secondary wash tank. This body of water is regulated by drawing water off from time to time through the pipe 82 and it is kept hot by the secondary wash tank heater 18.

In passing through the body of water in the secondary wash tank practically all the free water produced by the action of the current on the oil passing between the electrodes 51 and 52 is caught so that the oil in the top of the secondary wash tank contains only emulsified water.

In practice the plant is started by closing the valve 40 and circulating the oil to and from the secondary wash tank through the treater 14 until the body of oil in the top of the secondary wash tank is quite dry; that is to say, until it contains only one or two per cent of water.

I have found that in passing the oil through an electric field that only a certain percentage of the emulsified water carried therein will be agglomerated sufficiently to be readily removed and I have found that, by mixing a large volume of cleaned or relatively dry oil with the wet oil, I am able to deliver into the secondary wash tank an oil having a sufficiently low percentage of emulsion to be readily marketable. For example—if I wish to deliver an oil containing only 2% of emulsion and I find that my percentage of dehydration is 50%, I am able, by mixing sufficient 2% oil with wet oil, to produce a mixture containing 4% and to dehydrate this oil to 2% by a passage through the electric field. In some cases it is desirable to do this mixing in a secondary wash tank which can be accomplished by closing the valve 40 and opening the valve 41 so that the wet oil first passes through the water in the bottom of the secondary wash tank and is picked up by the pipe 17 as it mixes with the dry oil in the secondary wash tank. In any case, the oil taken in through the pipe 71 is somewhat wetter than the oil on top of the secondary wash tank 17.

I claim as my invention:

1. An electrical dehydrator for removing water from petroleum oil emulsions comprising a tank; a treater; electrodes in said treater; means for impressing an electromotive force between said electrodes; means for circulating oil from said tank through said treater and back into said tank in a closed ring; and means for introducing the wet oil to be treated into said ring.

2. An electrical dehydrator for removing water from petroleum oil emulsions comprising a tank; a treater; electrodes in said treater; means for impressing an electromotive force between said electrodes; means for circulating oil from said tank through said treater and back into said tank in a closed ring; and means for introducing the wet oil to be treated into said tank.

3. An electrical dehydrator for removing water from petroleum oil emulsions comprising a tank; a treater; electrodes in said treater; means for impressing an electromotive force between said electrodes; means for circulating oil from said tank through said treater and back into said tank; a pipe for withdrawing clean oil from the top of said tank; a water outlet pipe for withdrawing water from the bottom of said tank; and means for introducing the wet oil to be treated into said tank.

4. A process of dehydrating petroleum oils which comprises circulating oil from and back to a bulk supply which contains a much smaller water content than the oil to be treated; withdrawing cleaned oil from the top of said bulk supply and water from the bottom thereof; subjecting said circulating oil to an electric stress; and mixing the oil to be treated with said circulating oil before it enters the electric field.

5. An electrical dehydrator for removing water from emulsions, comprising a tank; a treater; electrodes in said treater; means for impressing an electromotive force between said electrodes; and means for circulating oil from said tank through said treater and back into tank.

6. An electrical dehydrator for removing water from emulsions, comprising a tank; a treater, electrodes in said treater; means for impressing an electromotive force between said electrodes; means for introducing into said dehydrator the wet oil to be treated; and means for circulating oil from said tank through said treater and back into tank.

7. A process for dehydrating petroleum oils which comprises the mixing of a stream of such oil with a second stream of oil having a less water content and then subjecting the mixture to an electrical stress, and then returning the treated oil to the source of the second stream.

8. A process for dehydrating petroleum oils which comprises the mixing of a stream of such oil with a second stream of oil having a less water content and then subjecting the mixture to an electrical stress, and then returning the treated oil to the source of the second stream, which source is of relatively large volume wherein the water separates out by gravity.

In testimony whereof, I have hereunto set my hand at Los Angeles, California, this 19 day of April, 1919.

FORD W. HARRIS.